Jan. 26, 1971    W. W. STEVENSON    3,557,618
FLUID METERS AND FLUID CONDUIT SYSTEMS EMBODYING THE SAME
Filed Sept. 11, 1968    3 Sheets-Sheet 1
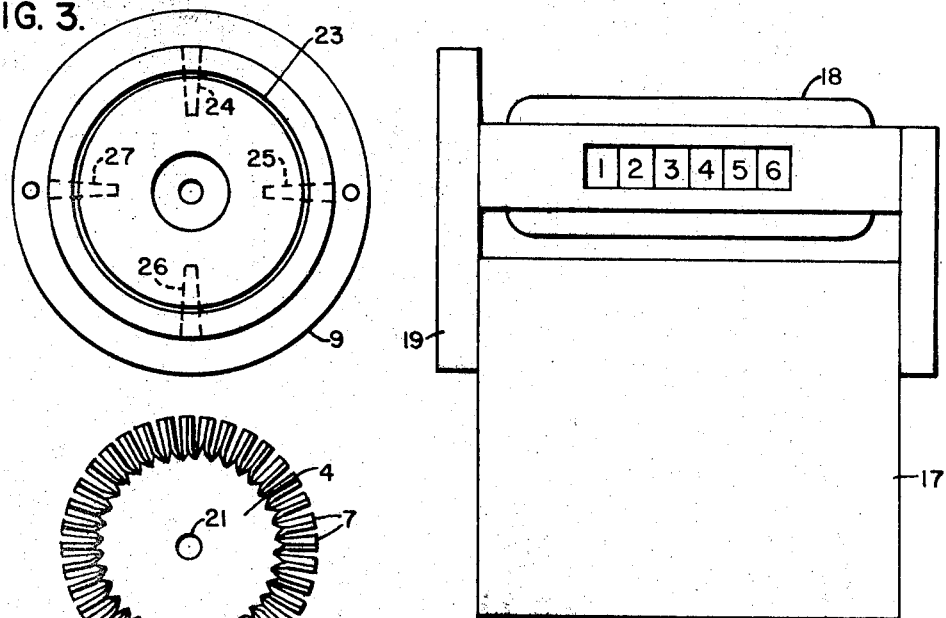
FIG. 3.
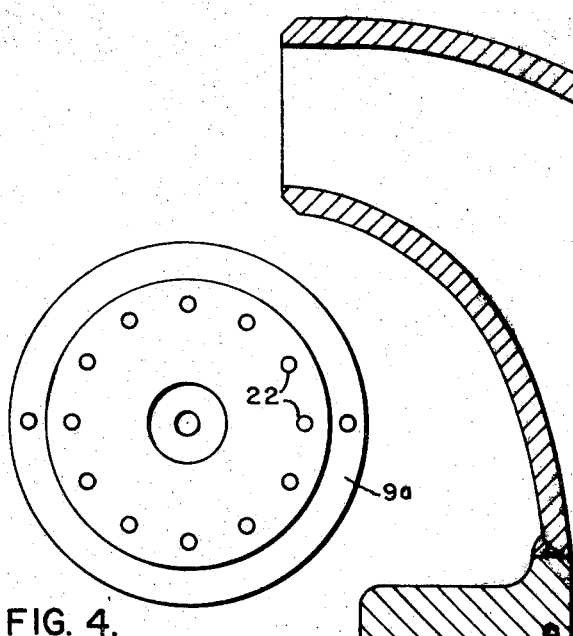
FIG. 2.
FIG. 4.
PRIOR ART
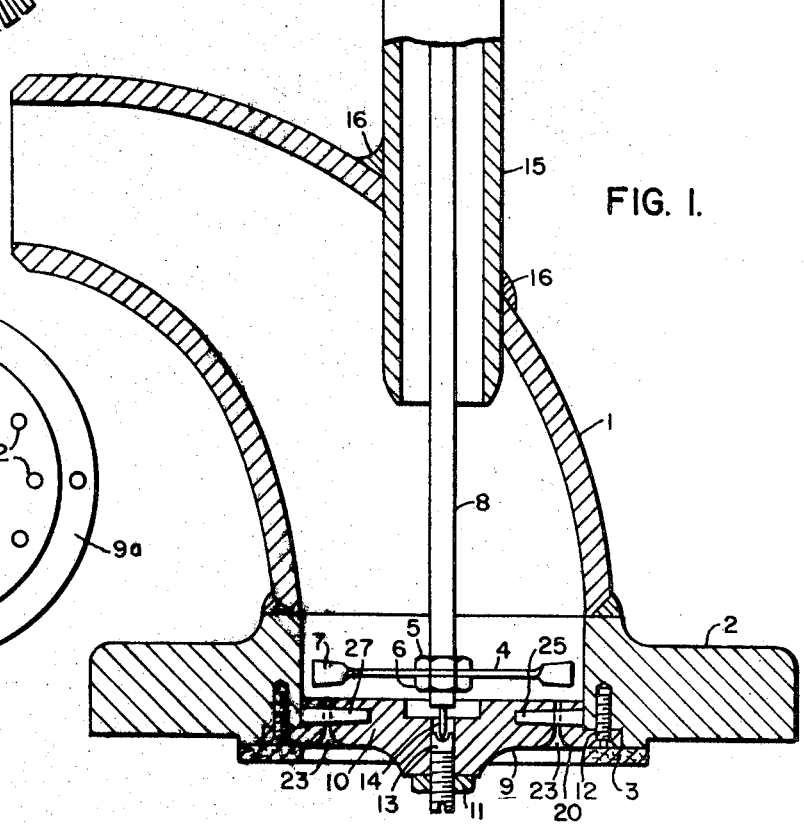
FIG. 1.
INVENTOR
Wilbur W. Stevenson
BY
Frederick Shape
ATTORNEY

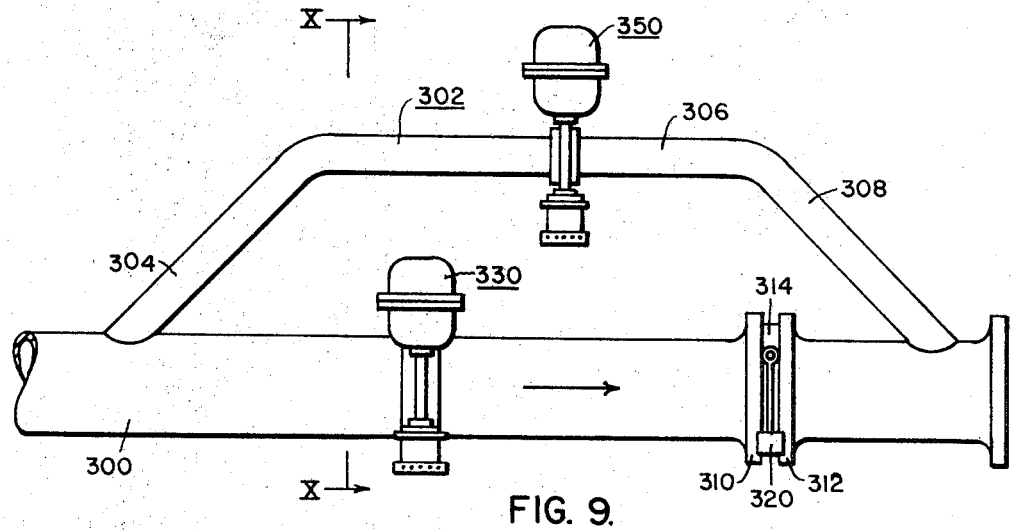
FIG. 9.
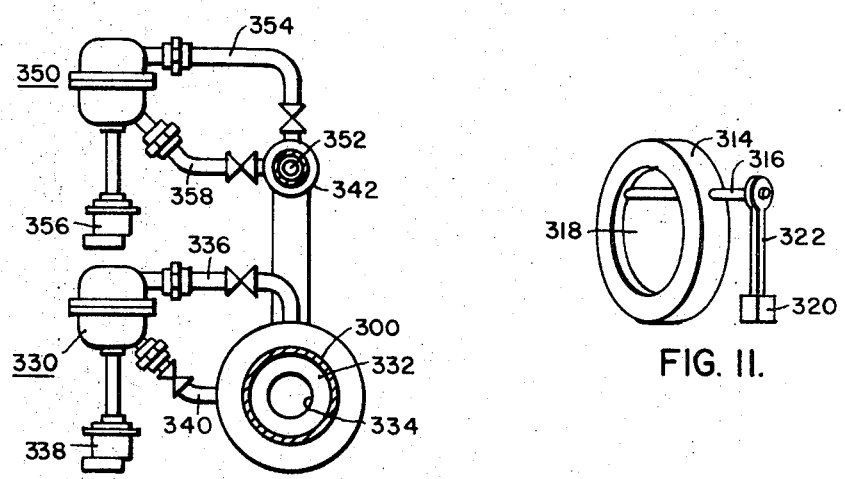
FIG. 10.
FIG. 11.
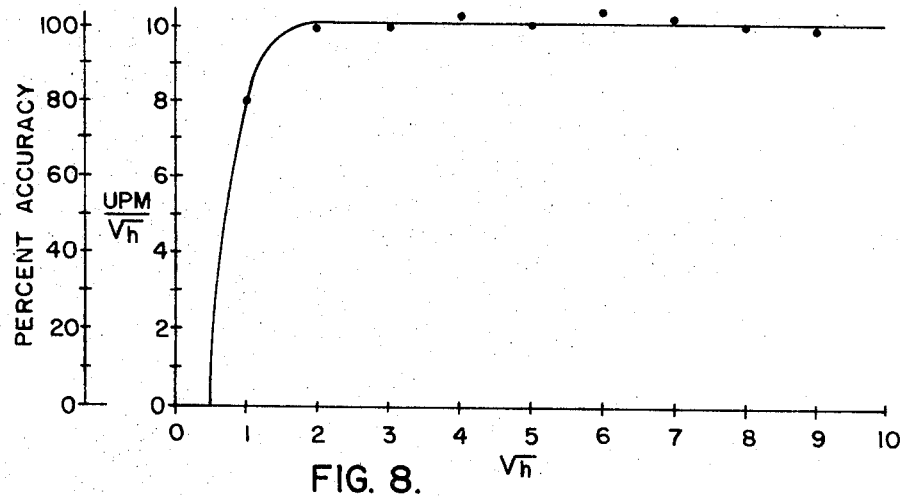
FIG. 8.

United States Patent Office 3,557,618
Patented Jan. 26, 1971

3,557,618
FLUID METERS AND FLUID CONDUIT SYSTEMS EMBODYING THE SAME
Wilbur W. Stevenson, 1125 Lancaster Ave., Pittsburgh, Pa. 15218
Filed Sept. 11, 1968, Ser. No. 759,043
Int. Cl. G01f 1/06
U.S. Cl. 73—231                           4 Claims

ABSTRACT OF THE DISCLOSURE

This invention relates to fluid flow meters for measuring accurately the flow of gases and liquids, the meter comprising a disk rotor with a plurality of small blades about its periphery, the blades being from about 5° to 40° to vertical to the disk, and a relatively unobstructed annular nozzle concentric with the rotor directing fluid at the blades so as to drive the rotor smoothly. The meter is connected to a conduit in which fluid is flowing and passing through an orifice so that a small portion is conveyed to the meter. A dual meter arrangement is disclosed for recording wide rates of fluid flow in a conduit.

BACKGROUND OF THE INVENTION

Various meters for measuring fluid flow in a conduit are known. The prior art practice has been to project a plurality of separate jets of the fluid at rotors having some form of blade. As the rotor revolves with respect to the jets they are subjected to shock and vibration as the individual jets of fluid impinge on each blade with problems arising such as from separate blows. The movement of the blade is not only erratic at certain conditions, but its accuracy is also affected.

The present meter is an improvement over the meter shown in my U.S. Pat. 3,183,712, particularly in respect to being a simpler and more compact structure and smoother in operation.

SUMMARY OF THE INVENTION

It is the object of the invention to provide a simple and compact fluid flowmeter which is free from vibration and is capable of accurately indicating over a relatively wide range of fluid flow in a conduit with which it is operatively associated. Briefly, the flow meter comprises an annular relatively unobstructed fluid nozzle which projects a thin circular ring of fluid upon the blades of a disk-shaped rotor which are disposed immediately thereabove. There is a smooth and constant action of the ring of such projected fluid upon the rotor blades, as compared to the prior art use of a series of separate fluid jets which strike rotor blades as a series of successive blasts. The blades are set at a small angle not exceeding about 40° to the axis of the rotor, and preferably at angles of at least 5° to the axis of the rotor.

The fluid flow meter is associated with a conduit carrying the fluid, either gaseous such as air, steam, and nitrogen or a liquid such as water, oil and gasoline. The conduit contains some restriction means such as a baffle or orifice so that on the upstream face or entrance to the restriction there is an increase in the fluid pressure proportional to the rate of flow of the fluid, and on the downstream or exit to the restriction there is a decrease in the fluid pressure, also proportional to the rate of flow of the fluid, there being a differential pressure between the entrance and the exit. A pipe or other means is attached to the conduit at the entrance and exit to convey a small portion of the fluid to the fluid meter. The rate of flow of the portion of the fluid is proportional to the differential pressure. The portion of the fluid flows through the annular nozzle where it is directed as a circular ring of fluid against the rotor blades.

While the meter is quite accurate over most of its range of use, the accuracy drops at extremely low fluid flow rates. To enable the accurate metering of a fluid at such extremely low flow rates, a dual conduit system is provided, namely a large conduit whose entire cross section is available at high flow rates of the fluid, and a first meter is associated therewith to measure such high flow rates, and a much smaller by-pass conduit, for example $\frac{1}{20}$ the area of the large conduit, is connected between two points on the large conduit at either side of the first meter, and a movable closure or baffle is provided in the main conduit between the points where the smaller conduit is connected, the movable baffle having a means for closing the large conduit when the fluid flow falls below a given rate so that fluid flow passes only through the smaller conduit, but at a relatively higher rate proportional to the ratio of the relative cross-sections, and a second meter in the smaller conduit measures the flow therein accurately down to negligibly small flow rates.

BRIEF DESCRIPTION OF THE DRAWING

FIG. 1 is a vertical view, partly in cross-section of the meter of this invention,
FIG. 2 is a top plan view of the rotor of the meter,
FIG. 3 is a top plan view of the annular nozzle,
FIG. 4 is a top plan view of a typical prior art nozzle with a plurality of nozzle apertures,
FIG. 8 is a graph showing the accuracy of the meter of this invention for various flow rates of air,
FIG. 9 is a view in elevation of a dual meter and conduit system,
FIG. 10 is a side view partly in section on lines X—X of FIG. 9,
and
FIG. 11 is a view in perspective of the movable closure of FIG. 9.

DETAILED DESCRIPTION OF THE INVENTION

Figure 7:
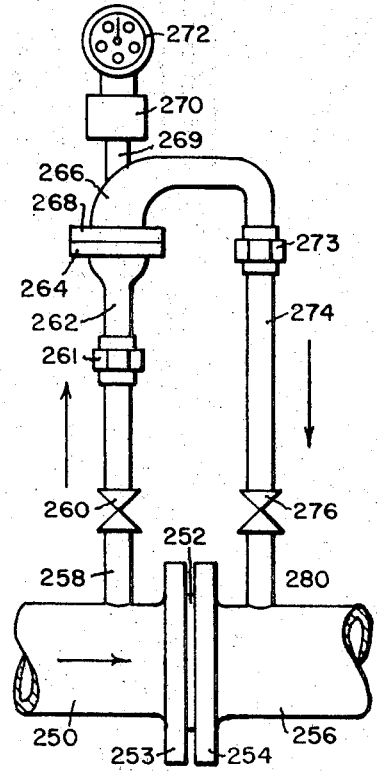
FIG. 7 is a vertical view of a conduit and the meter associated therewith.

Referring to FIGS. 1 to 3 of the drawing, there is illustrated the critical features of the fluid flow meter of this invention. Disposed in the elbow 1, which has a single flange 2 with a gasket 3, is a rotor 4 comprising a flat disk of stainless steel for example, with a central aperture 21 (see FIG. 2), held affixed on an integrator drive shaft 8 by two nuts 5 and 6. At the periphery of the rotor 4 are a plurality of blades 7 which may conveniently be produced by cutting the disk edge into segments and turning the segments until the flat surfaces of each blade are at an angle of not more than about 40° to the vertical axis of the rotor. For gases an angle of from 5° to 30° gives good results.

Disposed concentrically with the rotor 4 is an annular nozzle orifice 9 comprising an inner circular disk portion 10 which is provided with a central threaded aperture in which is a screw-threaded adjustable stud member having a pivot bearing 13 at its upper end in which a bearing 14 of shaft 8 is mounted. Nut 11 on the threaded stud member 12 enables it to be held in any selected position of adjustment.

The annular orifice 9 also includes an outer circular ring 20 concentric with the inner disk 10 and it is fastened by screws 12 to the flange 2. A uniformly wide orifice space 23 is present between the outer circular ring 20 and inner disk 10. As is shown in the drawing in FIG. 1, the space 23 comprises rounded or arcuate fluid entrance edges on both the circular ring and inner disk which lead smoothly to a vertical walled orifice exit section so that fluid is projected as a uniform circular ring from its upper surface against the blades 7. The width of the space 23 is a small fraction of the blade length, ordinarily less than one-half. The path of rotation of the blades is concentric with such projected fluid. In order to retain the precise dimensions of the orifice space 23, small tapered pins 24, 25, 26 and 27 are driven into cone shaped positioning apertures in the outer ring and inner disk. Other means for holding the outer ring 20 and inner disk 10 in position may be employed. For example, arcuate arms extending from the bottom surface of the disk 10 to ring 20 may be used.

For a rotor about 2 inches in outer diameter with blades of about 1/4 to 3/8 inch in length, a space 23 of about 1/32 inch is adequate to drive the rotor accurately over a wide range of gas pressures.

Shaft 8 passes through a tube 15, welded at 16 to the elbow 1, to an integrating register 17 which is mounted on and supported by the tube 15. The integrator includes suitable well known mechanism with a drive gear disposed in enclosure 19 to drive the numerical register or counter 18. A support member 20 holds the other end of the counter 18. Obviously, circular indicating disks with pointers may be employed. The connection between rotor shaft 8 and the integrating register may be that shown in my U.S. Pat. 3,183,712 in FIG. 1 wherein magnetic coupling through a stainless steel or nonmagnetic disk is disclosed.

According to prior art practice, the orifice plate of FIG. 4 would be employed wherein a plurality of separate orifices 22 would direct a blast of gas or fluid against the rotor. Such blasts of gas would subject each blade as it passes by to a blow with resultant vibration. By contrast the annular orifice 23 of the present invention projects a substantially uniform circle of fluid against the blades 7 to cause a constant smooth force to move the rotor 4. Not only is the movement of the rotor 4 more uniform, but the rotor will respond more precisely to all velocities of the annular circle of fluid than it would to the discrete fluid jets from the several nozzles 22.

Figure 5:
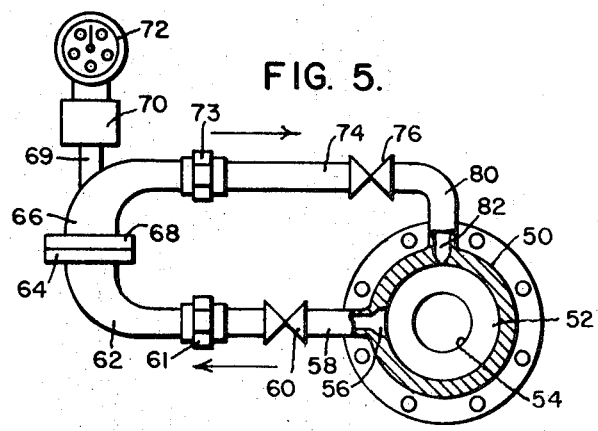
FIGS. 5 and 6 are side views, partly in section of a conduit illustrating two ways of attaching the meter of this invention thereto.
Figure 6:
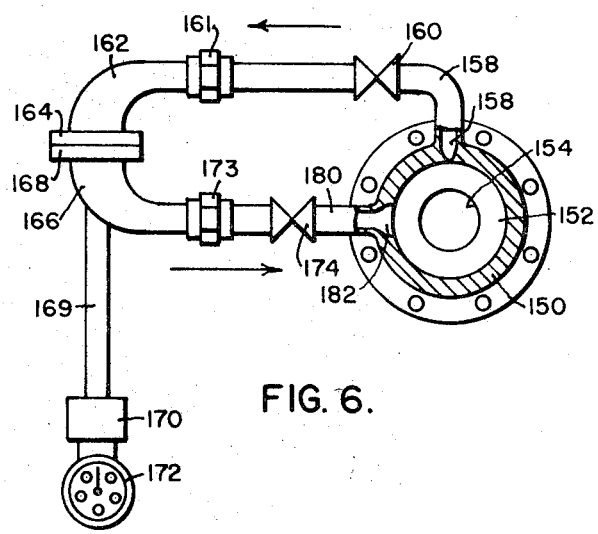

Referring to FIGS. 5, 6 and 7, there are shown several ways of connecting the flow meter to a conduit carrying a fluid whose flow is to be measured. Elbows 66, 166 and 266, respectively, carry the meter mechanism and integrating register in various positions for accessibility and convenient reading.

In FIG. 5, conduit 50 is provided with an orifice plate 52 with a restrictive orifice 54 therein so that a pressure differential exists between the entrance or upstream face and the exit or downstream face. A pipe 58 connects to the entrance 56 to convey a small portion of the fluid passing through conduit 50, past valve 60 to elbow 62 connected by a union 61 to the pipe. The fluid passes from elbow 62 through an annular orifice and rotor in elbow 66, corresponding to the structure shown in detail in FIG. 1, and thence through pipe 74, valve 76, and pipe 80 to exit 82. Flanges 64 and 68 join elbows 62 and 66, while union 73 joins pipe 74 to elbow 60. Pipe 69 not only supports the integrator 70 and register 72, but also protects the rotor shaft 8 from the meter mechanism.

In FIG. 6, fluid in conduit 150 at the entrance 156 of baffle 152 with orifice 154, is conveyed by pipe 158 past valve 160 and union 161 to an elbow 162 joined by flanges 164 and 168 to elbow 166 carrying the meter of this invention and the integrator 170 and register 172. Gases exhausting from the meter pass from elbow 166 through union 173, past valve 174 to pipe 180 to exit 182 on the downstream side of baffle 152.

In FIG. 7, conduit 250 is joined by flanges 253 and 254 to conduit 256. An orifice plate 252 is inserted between the flange so as to provide a pressure differential in the fluid or between the entrance and exit sides of the orifice plate. Pipe 258 conveys a portion of the fluid from the conduit 250 past the valve 260 and union 261 to a reducing coupling 262 which is connected by flanges 264 and 268 to the elbow 266. Within elbow 266 is mounted an annular orifice member and bladed rotor member as shown in FIG. 1. Tube 269 carries the integrator 270 and register 272 actuated by the rotor shaft. Exhaust fluid from the rotor passes through union 273 to pipe 274, past valve 276 and thence by pipe 280 to the exit into the conduit 256.

Tests using air moving under various pressure heads were made to determine the accuracy of a meter constructed in accordance with this invention. The rotor was a stainless steel disk two inches in diameter with some 36 blades about 1/4 inch long struck up from the periphery. The blade surfaces were 30° from the vertical. The annular orifice was 1/32 inch wide and of the construction shown in FIGS. 1 and 3. Air at the pressure differentials in inches of water as indicated in the table was applied and the revolutions of the rotor, u.p.m., was plotted against the square root of the pressure differential $\sqrt{h}$. These data are plotted in FIG. 8.

| Diff. in $H_{20}$ | U.p.m. | $\sqrt{h}$ | U.p.m./$\sqrt{h}$ | Percent accuracy |
| --- | --- | --- | --- | --- |
| 1/4 | .36 | .50 | .7 | 7 |
| 1/2 | 3.5 | .71 | 5 | 50 |
| 1 | 8.0 | 1.00 | 8 | 80 |
| 2 | 13.2 | 1.41 | 9.4 | 94 |
| 3 | 16.8 | 1.73 | 9.7 | 97 |
| 5 | 24.4 | 2.24 | 10.9 | 109 |
| 7 | 26.4 | 2.65 | 10.0 | 100 |
| 9 | 30.1 | 3.0 | 10.1 | 101 |
| 16 | 41.6 | 4.0 | 10.4 | 104 |
| 25 | 50.5 | 5.0 | 10.1 | 101 |
| 36 | 63.2 | 6.0 | 10.5 | 105 |
| 49 | 71.5 | 7.0 | 10.3 | 103 |
| 64 | 80.8 | 8.0 | 10.1 | 101 |
| 81 | 90.2 | 9 | 10.0 | 100 |

These were short time tests and covered an extraordinary wide range of fluid flow differentials.

Considering the shortness of the tests and the wide range, these data indicate an extremely accurate flow meter suitable for many applications. Tests of liquids, such as water, show a high degree of accuracy of measurement by the meter of this invention.

EXTREMELY WIDE RANGE FLOW METER SYSTEM

Referring to FIGS. 9, 10 and 11, there is illustrated a duplex or dual meter system for measuring flow of fluids with great accuracy over an extremely wide range of flow rates. A large main fluid conduit 300 is provided with a by-pass conduit 302 of much smaller diameter, for example 1/5 to 1/10 the diameter of conduit 300. The by-pass conduit 302 has a first tangent 304 through which fluid can enter to a straight section 306 and an exit tangent 308 re-entering conduit 300. Between the points where tangent 304 connects to conduit 300 and tangent 308 connects to conduit 300, is disposed a first meter 330 and a movable baffle or closure section 314 disposed between flanges 310 and 312 in the conduit 300.

As shown in FIG. 11, the movable closure 314 comprises a ring in which is turnably mounted a shaft 316 carrying a baffle 318 capable of substantially preventing all fluid flow in conduit 300. A weight 320 mounted on arm 322 is affixed to shaft 316 so that under the force of gravity the closure 318 tends to assume a vertical position blocking fluid flow. By reason of the eccentric mounting of closure 318 on shaft 316, at fluid flows below a selected value the closure is vertically disposed, but at some predetermined value dependent on the weight 320 and length of arm 322, the fluid pressure will overcome these forces and move the baffle to an open position. At these closed position, due to low fluid flows, all the fluid goes through the by-pass conduit 302.

A flow meter 350 is inserted into the small by-pass conduit 302 with a restrictive orifice 352 in the conduit, and pipe 354 conveying a portion of the fluid from the entrance side to the meter where it operates the meter and exhausts to the exit through pipe 358. Quantities of fluid passing at low flow rates through the large conduit 300 cannot get past closure 318 and accordingly must pass through by-pass conduit 302 where its velocity is greatly increased in proportion to the ratio of the area of the interior of conduit 300 to the interior of conduit 302. Meter 350 will accurately record such high flows on integrator 356 since they will be on the flat part of the curve at the 100% accuracy level in FIG. 8. In the large conduit 300 such flows would have been at the inaccurate end of up to $\sqrt{h}=2$ values of this curve.

Once the flow rate reaches a selected high value, selected at the highest values of pressure differentials for the meter 350, then the closure 318 opens and fluid flow at a high rate is initiated in conduit 300 and meter 330 receives a portion of fluid from the entrance of orifice plate 332 in conduit 300 via pipe 336 and exhausts it through pipe 340 to the exits of the orifice plate. The integrator recorder 338 registers the flow through the large conduit. By combining the readings of both integrators 356 and 338, an accurate account of all fluid flow is obtained.

It is understood that various modifications of the structures shown and described can be made, and suitable metals can be employed for the meter components.

I claim as my invention:

1. A fluid meter for measuring relatively accurately the flow of a fluid in a conduit over a substantially wide range of flow rates, in combination, restriction means in the conduit to provide a pressure differential between the entrance to and the exit from the restriction means, means for conveying a portion of the fluid from said entrance to the fluid meter and for returning said portion of the fluid to said exit, the meter comprising a housing, a rotor, within said housing, said rotor having a plurality of small blades disposed at its periphery, each blade having a surface upon which said portion of the fluid impinges, the surface being disposed at a small angle not exceeding about 40° to the axis of the rotor, means to rotatably mount said rotor, an orifice plate situated ahead of said rotor and in the flow path, said orifice plate having a relatively unobstructed annular orifice circumscribed in the orifice plate and concentric with the adjacent rotor blades, said orifice having a converging nozzle configuration aligned parallel to the axis of the rotor, said orifice having an upstream intake side and a downstream exhaust side said intake side width being considerably larger than said exhaust side width and said exhaust side width being less than one-half of the length of said rotor blades, said orifice directing said portion of the fluid from said entrance as a relatively uniform thin walled circular cylinder against said surfaces of the blades to cause the rotor to revolve smoothly and in proportion to said differential pressure, and integrating means cooperatively associated with the rotor to indicate the revolutions of the rotor.

2. The fluid meter of claim 1, wherein the said surfaces of said blades are at an angle of at least 5° to 30° to the rotor axis.

3. The fluid meter of claim 1, wherein the width of the exit end of the orifice is less than half the length of the blades.

4. A fluid meter system comprising a main conduit through which the fluid to be metered passes, a restriction means in the main conduit to provide a pressure differential between the entrance to and the exit from the restriction, means at said entrance to convey a portion of the fluid to a first meter, means for conveying exhaust fluid from the first meter to said exit, the meter being operable in accordance with the pressure differential to accurately record the flow of the fluid conveyed to the first meter above a given differential pressure, a movable closure means in the main conduit beyond the restriction means, the baffle means including means for closing the flow of fluid in the main conduit when the flid flow is below a selected rate, and permitting relatively unrestricted flow rates above said selected rate, a relatively small fluid conduit having one end connected to the main conduit at a point prior to the restriction means and its other end connected to the main conduit at a point beyond the movable closure means, a second restriction means in the small fluid conduit to provide a pressure differential between a second entrance to and a second exit from said restriction means, means at said second entrance to convey fluid to a second meter operable in accordance with the pressure differential and means to convey exhaust fluid from the second meter to said second exit, the second meter recording accurately the flow of fluid at flow rates below said given rate at which the first meter is relatively inaccurate, the first and second meters each comprising a housing, within said housing a rotor said rotor having a plurality of small blades disposed at its periphery, each blade having a surface upon which the portion of the fluid impinges, the surface being disposed at a small angle of at least 5° but not exceeding about 30° to the axis of the rotor means to rotatably mount said rotor, an orifice plate situated ahead of said rotor and in the flow path, said orifice plate having a relatively unobstructed annular orifice circumscribed in the orifice plate and concentric with the adjacent rotor blades, said orifice having a converging nozzle configuration aligned parallel to the axis of the rotor, said orifice having an upstream intake side and a downstream exhaust side, said intake side width being considerably larger than said exhaust side width and said exhaust side width being less than one-half of the length of said rotor blades, said orifice directing said portion of the fluid from said entrance against said surfaces of the blades to cause the rotor to revolve smoothly and in proportion to said differential pressure, and integraitng means cooperatively associated with the rotor to indicate the revolutions of the rotor.

References Cited

UNITED STATES PATENTS

| 1,307,337 | 6/1919 | Bassett | 73—197 |
| 3,183,712 | 5/1965 | Stevenson | 73—203 |
| 3,350,938 | 11/1967 | Rittenhouse et al. | 73—231 |
| 3,470,896 | 10/1969 | AuWerter | 137—110 |

JAMES J. GILL, Primary Examiner

M. SMOLLAR, Assistant Examiner

U.S. Cl. X.R.

73—197, 203, 206; 137—110